US012758362B2

(12) United States Patent
Zhu et al.

(10) Patent No.: US 12,758,362 B2
(45) Date of Patent: Oct. 13, 2026

(54) METHODS FOR PERSONALIZED ROOT-SHAPED IMPLANT

(71) Applicant: HANGZHOU TOOTH NATURE BIOTECHNOLOGY CO. LTD, Hangzhou (CN)

(72) Inventors: Yi Zhu, Hangzhou (CN); Mengfei Yu, Hangzhou (CN)

(73) Assignee: HANGZHOU TOOTH NATURE BIOTECHNOLOGY CO. LTD, Hangzhou (CN)

( * ) Notice: Subject to any disclaimer, the term of this patent is extended or adjusted under 35 U.S.C. 154(b) by 120 days.

(21) Appl. No.: 18/890,729

(22) Filed: Sep. 19, 2024

(65) Prior Publication Data

US 2025/0318903 A1 Oct. 16, 2025

(30) Foreign Application Priority Data

Apr. 15, 2024 (CN) ......................... 202410449929.6

(51) Int. Cl.
*G06T 1/00* (2006.01)
*A61C 7/00* (2006.01)

(52) U.S. Cl.
CPC ........ *A61C 7/002* (2013.01); *A61C 2007/004* (2013.01)

(58) Field of Classification Search
CPC ..... G06T 15/005; G06T 19/00; G06T 11/001; G06T 11/40; G06T 11/60; G06T 17/20; G06T 1/60; G06T 2210/52; G06T 11/00; G06T 2211/441; G06T 7/11; G06F 40/30; G06F 40/56; G06F 18/214; G06F 9/50; G06F 9/5027; G06N 3/084; Y02T 10/40; G06V 20/70; H04N 21/816; Y02D 10/00; A61C 7/002; A61C 2007/004; A61C 13/0004; A61C 8/00; A61C 13/0019
USPC .......................................................... 345/418
See application file for complete search history.

(56) References Cited

U.S. PATENT DOCUMENTS

| | | | | |
|---|---|---|---|---|
| 2004/0265777 A1* | 12/2004 | Heasley | ............... | A61C 9/0033 433/136 |
| 2022/0180447 A1* | 6/2022 | Kearney | ................ | G06N 3/045 |
| 2023/0031165 A1* | 2/2023 | Rubbert | ............... | A61C 9/0046 |
| 2024/0256719 A1* | 8/2024 | Zhao | ...................... | A61C 13/34 |

* cited by examiner

*Primary Examiner* — Gordon G Liu

(57) ABSTRACT

Methods for a personalized root-shaped implant are disclosed. The method for generating a personalized root-shaped implant model includes capturing a CBCT image of a missing teeth area of a patient; performing image segmentation and model reconstruction on the CBCT image and obtains a full-mouth original teeth model; selecting a target tooth model from the full-mouth original teeth model; and processing the target tooth model in a preset strategy such that the personalized root-shaped implant model is generated.

18 Claims, 8 Drawing Sheets

METHODS FOR PERSONALIZED ROOT-SHAPED IMPLANT

CROSS-REFERENCE TO RELATED APPLICATIONS

The present disclosure claims a priority to Chinese Patent Application No. 202410449929.6, filed on Apr. 15, 2024, the content of which is herein incorporated by reference in its entirety.

TECHNICAL FIELD

The present disclosure generally relates to the technical field of healthcare, and in particular to a method for generating a personalized root-shaped implant model, a method for manufacturing a personalized root-shaped implant, and a method for using a personalized root-shaped implant.

BACKGROUND

Dental implants are a restoration form of missing teeth, in which the upper dental restoration is supported and retained by a substructure implanted in the bone tissue.

The implants used in the dental implants are prepared using titanium and alloys thereof. With a matching way such as threading, overfilling, the implant is placed in the alveolar bone of the patient after the tooth root of the patient is missing or extracted, such that the implant is firmly combined with the alveolar bone. After the implant has stabilized in the alveolar bone, and then the abutment, crowns and other accessories are gradually installed. Dental implants can transmit a force generated when the patient is chewing through the crown, the abutment, and the implant, so that the chewing force is transmitted to the alveolar bone. Thus, the dental implants have mechanical properties close to that of the patient's native teeth. Further, the dental implants also have excellent aesthetic effects in appearance, so it can be said that the dental implants are currently one of the more excellent types of dentures.

According to archaeological discoveries, as early as in ancient times, human beings have tried to use various materials to replace missing teeth, including but not limited to bones and shells. True dental implant technology began to sprout in the 1930s. Subsequently, during in vivo microscopic observation of animal bones, Prof. Branemark of the Medical University of Gothenburg, Switzerland, accidentally discovered that an optical speculum made of titanium could be firmly bonded to the bone tissue. Therefore, he innovatively put forward the concept of "osseointegration" that titanium implant devices can be tightly bonded to bone tissue, and this concept has become theoretical basis of modern oral implantology, which has made the first leap in dental implant technology, and he has become the well-known "Father of Dental Implants". Subsequently, researchers from all over the world have continued to iterate on the materials and surface treatment of the dental implants, as well as incorporating CT diagnostics, minimally invasive and other medical techniques, and thus, the current oral implant technology has been formed ultimately.

With the development of oral implant technology, a large number of actual cases have shown that the traditional uniform specification of implant cannot be well matched with the patient's various kinds of tooth roots, the size and length of which are not consistent. This leads to s cumbersome process of dental implant, need to wait for the alveolar bone to be recovered, and has a long cycle. Further, since there use punched holes and the matching way of threading, there need multiple surgeries, which means that the patient needs to bear more pain and the bore postoperative risk is also greater. Therefore, the oral implant technology has been seeking a new way of implant production and implantation.

SUMMARY OF THE DISCLOSURE

According to one aspect of the present disclosure, a method for generating a personalized root-shaped implant model is provided, which includes capturing a CBCT image of a missing teeth area of a patient; performing image segmentation and model reconstruction on the CBCT image and obtains a full-mouth original teeth model; selecting a target tooth model from the full-mouth original teeth model; and processing the target tooth model in a preset strategy such that the personalized root-shaped implant model is generated.

According to another aspect of the present disclosure, a method for manufacturing a personalized root-shaped implant is provided, which includes: obtaining a personalized root-shaped implant model; and manufacturing a personalized root-shaped implant and a die of the personalized root-shaped implant according to the personalized root-shaped implant model; wherein obtaining the personalized root-shaped implant model includes: capturing a CBCT image of a missing teeth area of a patient; performing image segmentation and model reconstruction on the CBCT image and obtains a full-mouth original teeth model; selecting a target tooth model from the full-mouth original teeth model; and processing the target tooth model in a preset strategy such that the personalized root-shaped implant model is generated.

According to yet another aspect of the present disclosure, a method for using a personalized root-shaped implant is provided, which includes: obtaining the personalized root-shaped implant model and a die of the personalized root-shaped implant; and tapping the personalized root-shaped implant into the alveolar socket after the die is properly tried on; wherein the obtaining the personalized root-shaped implant and the die of the personalized root-shaped implant includes: capturing a CBCT image of a missing teeth area of a patient; performing image segmentation and model reconstruction on the CBCT image and obtains a full-mouth original teeth model; selecting a target tooth model from the full-mouth original teeth model; processing the target tooth model in a preset strategy such that the personalized root-shaped implant model is generated; and manufacturing the personalized root-shaped implant and the die of the personalized root-shaped implant according to the personalized root-shaped implant model.

DETAILED DESCRIPTION

A two-segment implant is a dental implant technique that involves placing different parts of the implant in two separate surgeries. In the two-segment implant technique, the abutment of the implant and the retention body are two segments, rather than being the whole one. In the surgery, the retention body, which is bonded to the bone tissue, and the abutment, which is bonded to the gum tissue, are surgically placed in two separate procedures. An implant-centered screw is connected between the abutment and the retention unit in the two-segment implant technique, such that a single one is formed. Advantages of this technique include better osseointegration, reduced risk of infection, and offers a variety of prosthetic restorations with a high success rate.

Personalization is an important development in current dental implant technology, which offers significant improvements in response to problems such as mismatched specifications of traditional implants. Personalization literally means that the patient's tooth roots are individually designed so that each tooth has its own suitable implant. Such personalized implants result in a better bonding to the alveolar bone, the reduced number of surgical cycles, less pain and post-surgical risk for the patient, and better mechanical and aesthetic performance in the later stages. However, previous research has not addressed how personalized implants are designed and how personalized implants are used.

Therefore, the research objective of the present disclosure is to propose a two-segment personalized implant, which achieves a short cycle time, low risk, and high success rate of personalized dental implants.

The present disclosure is described in further detail below in conjunction with the accompanying drawings and specific embodiments.

Figure 1:
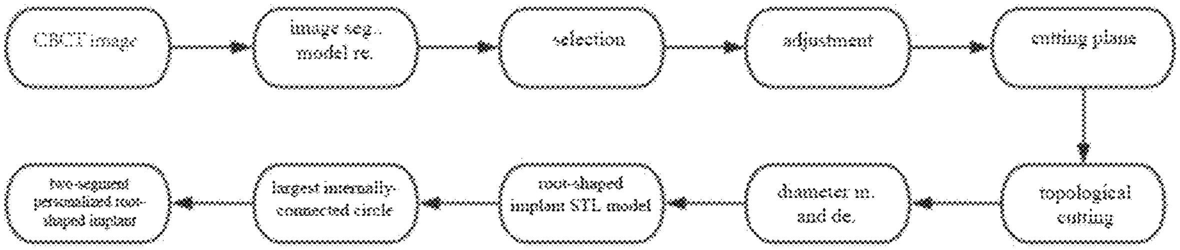
FIG. 1 shows a schematic diagram of a manufacturing process of a two-segment personalized root-shaped implant.

As shown in FIG. 1, a manufacturing method for a two-segment personalized implant includes the following actions/operations.

Figure 2:
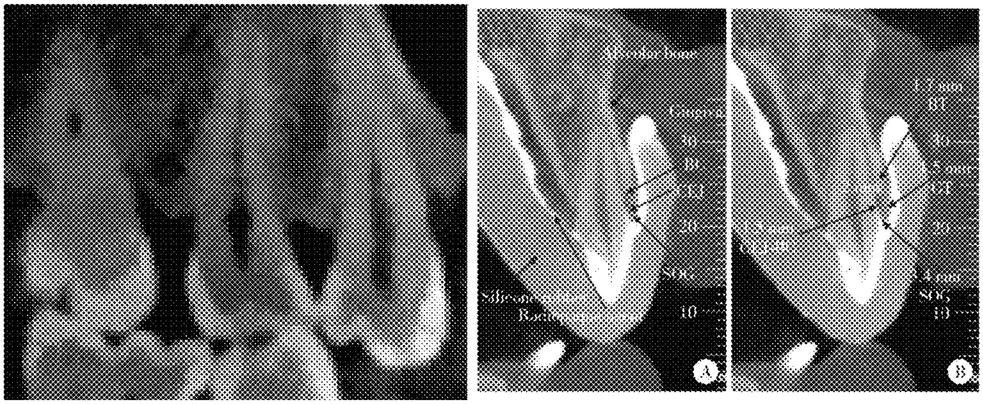
FIG. 2 shows a schematic diagram of a CBCT image.

At S1, the method captures a CBCT image of a missing teeth area of a patient (as shown in FIG. 2), and obtains DICOM format data thereof.

Figure 3:
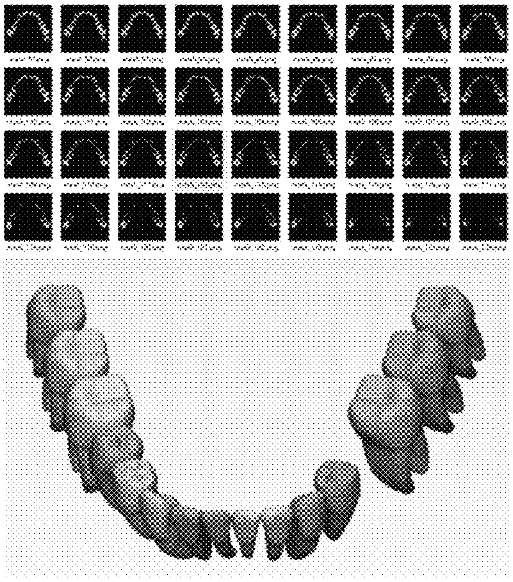
FIG. 3 shows a schematic diagram of image segmentation and model reconstruction for the CBCT image.

At S2, the method performs image segmentation and model reconstruction on the CBCT image and obtains a full-mouth original teeth model (as shown in FIG. 3).

Figure 4:
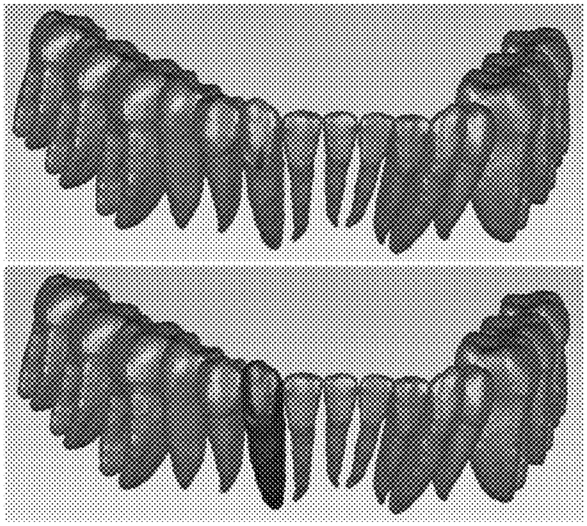
FIG. 4 shows a schematic diagram of target tooth selection.

At S3, the method selects a target tooth model from the full-mouth original teeth model (as shown in FIG. 4).

At S4, the method edits the target tooth model into a personalized root-shaped implant model in a preset editing strategy. That is, the target tooth model is processed in a preset strategy to obtain the personalized root-shaped implant model, and thus, the personalized root-shaped implant model is generated.

At S5, the method manufactures and prints a personalized root-shaped implant and a die according to the personalized root-shaped implant model.

The CBCT image is a cone-beam CT (as shown in FIG. 2), and is obtained in DICOM format data (DICOM, Digital Imaging and Communications in Medicine, is an international standard for medical images and related information, which defines medical image formats that can be used for data exchange and have a quality that can meet clinical needs). 3D (three dimension) reconstruction is performed for the patient's teeth using the CBCT data three-dimensional editing software to obtain STL data thereof, and the STL is used to represent closed surfaces or bodies, wherein the CBCT data three-dimensional editing software may be applied in a commercialized software such as Mimics.

In the methods for the personalized root-shaped implant of the present disclosure, image segmentation and model reconstruction are performed on the CBCT image and a full-mouth original teeth model is obtained, a target tooth model is selected from the full-mouth original teeth model, the target tooth model is edited into a personalized root-shaped implant model in a preset editing strategy, and a personalized root-shaped implant and a die are manufactured and printed. Thus, in the process of oral implantation, this shortens the implantation cycle and improves the implantation efficiency without a bone healing period and with being ready to extract and plant, and reduces pain of patients and improves comfort of patients without bone grafting.

The manufactured and printed personalized root-shaped implant and the die highly match with the shape of the patient's original alveolar socket, which realizes that the tolerance between the personalized root-shaped implant and the alveolar socket is no more than 0.1 mm. Thus, the stress distribution level of the personalized implant closes to that of the original tooth, which can effectively reduce the phenomenon of bone resorption, improve the compatibility of the personalized root-shaped implant and the alveolar socket, and enhance implantation effect.

The manufacturing method for the personalized root-shaped implant in the present disclosure has high versatility, and the personalized root-shaped implant can be manufactured for all the teeth in the whole tooth position; and the designed personalized root-shaped implant can satisfy the need for the initial stability of immediate implantation.

The personalized root-shaped implant is a metal root-shaped implant, and the die is a plastic die.

The actions/operations at S4 includes the following actions/operations.

Figure 5:
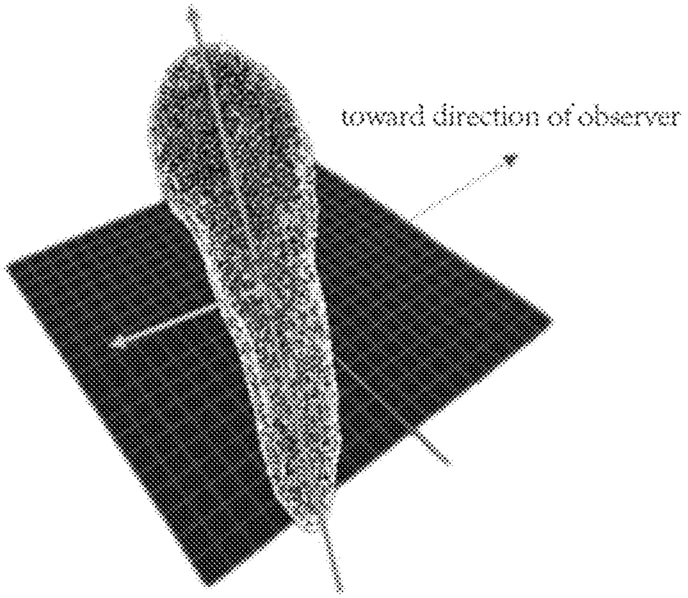
FIG. 5 is a schematic diagram of a coordinate adjustment of a target tooth model.

At S41, the method adjusts a coordinate of the target tooth model of the patient and determines a direction of the target tooth model (as shown in FIG. 5). That is, the coordinate of the target tooth model and the direction of the target tooth model are determined. For example, the direction of the target tooth model is determined firstly, and then the coordinate of the target tooth model is determined based on the direction of the target tooth model.

Figure 10:
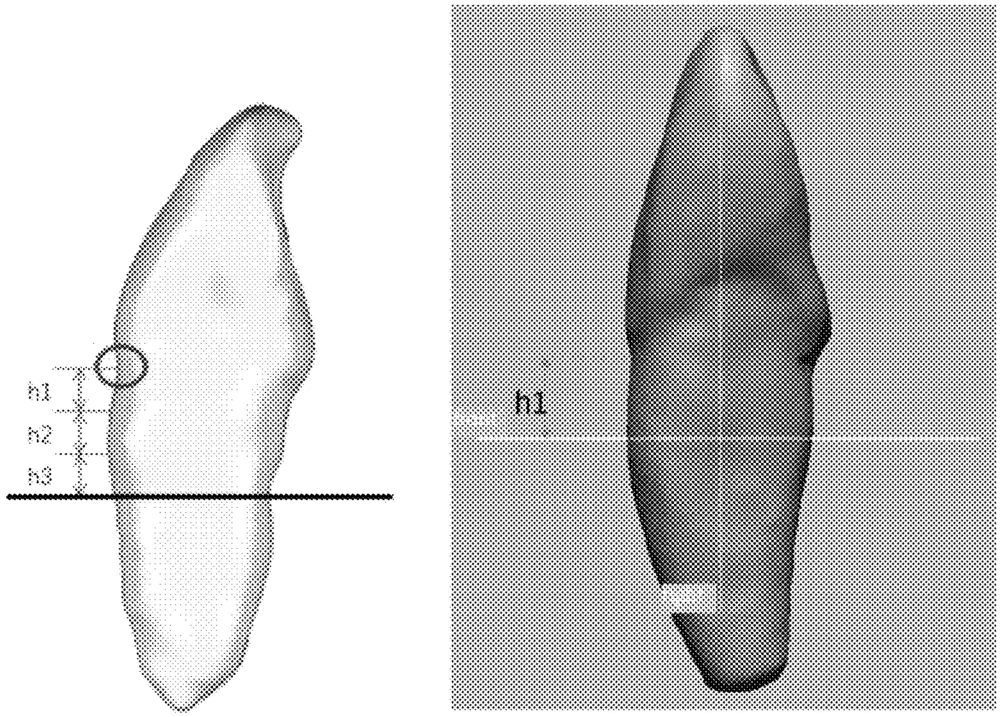
FIG. 10 shows a schematic diagram of determining a cutting plane.

At S42, the method determines a cutting plane of the target tooth model according to a height of the personalized root-shaped implant model corresponding to the target tooth model (as shown in FIG. 10). That is, the cutting plane of the target tooth model is determined based on the height of the target tooth model, and the height of the target tooth model is based on the coordinate of the target tooth model.

Figure 6:
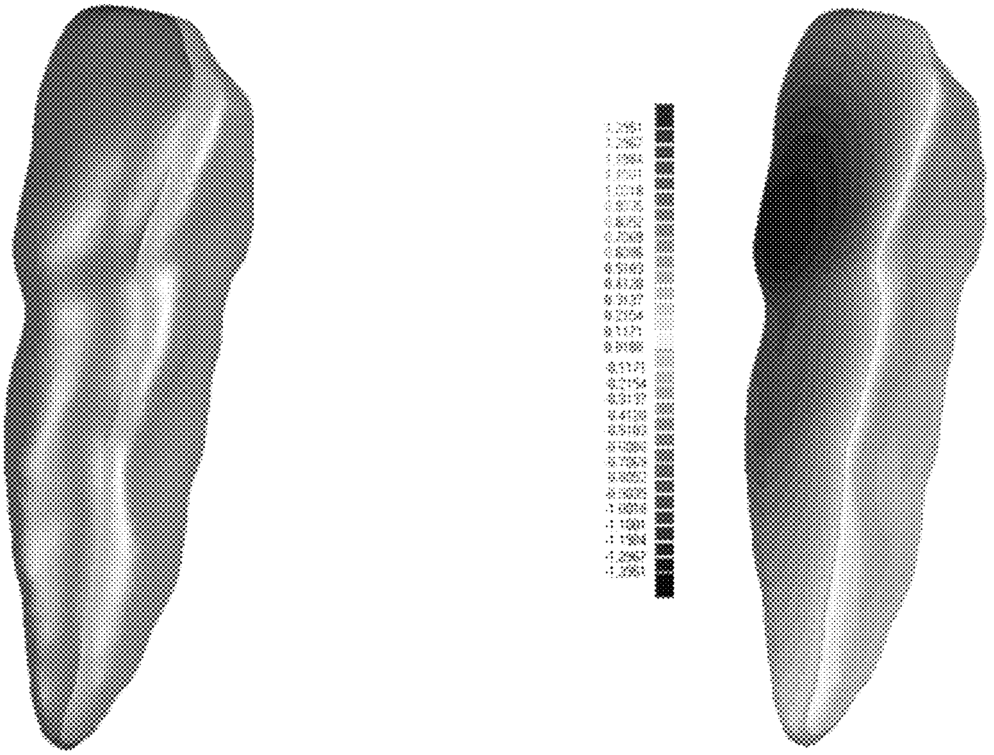
FIG. 6 shows a schematic diagram of diameter increasing and decreasing for a cut target tooth model.
Figure 7:
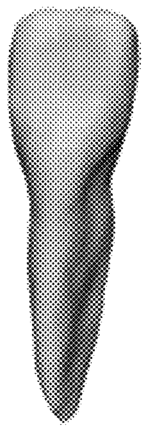
FIG. 7 shows a schematic diagram of the STL model of the personalized root shaped implant.
Figure 11:
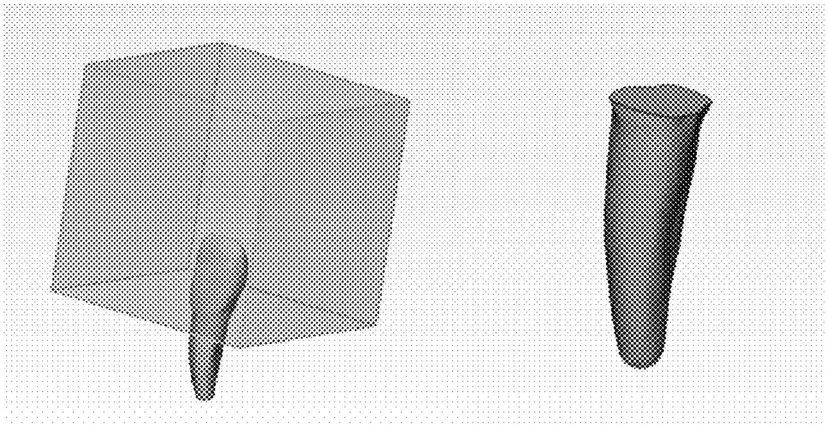
FIG. 11 is a schematic diagram of the personalized root-shaped implant model before and after cutting.

At S43, the method obtains a cut target tooth model for the personalized root-shaped implant model by using a manner of topological cutting, (as shown in FIG. 11), and performs a diameter increasing and decreasing process on a cut-off portion (as shown in FIG. 6) and obtains a personalized root-shaped implant STL model (as shown in FIG. 7). That is, the cut target tooth model includes the cut-off portion of the target tooth model. The target tooth model is cut at the cutting plane by using the manner of topological cutting, such that the cut-off portion of the target tooth model is obtained, and the diameter increasing and decreasing process is performed on the cut-off portion to obtain a personalized root-shaped implant STL model.

As the diameter increasing and decreasing process is performed on the cut-off portion, a bone resorption phenomenon can be reduced, which occurs as the alveolar bone of the upper labial side of the alveolar fossa is under stress, and which results in exposure of the implant and thus affects the effectiveness of the implant. Thus, the initial stability of the implant can be ensured.

Figure 8:
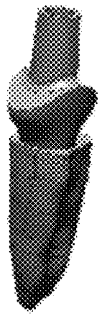
FIG. 8 shows a schematic diagram of a two-segment personalized root-shaped implant model.
Figure 9:
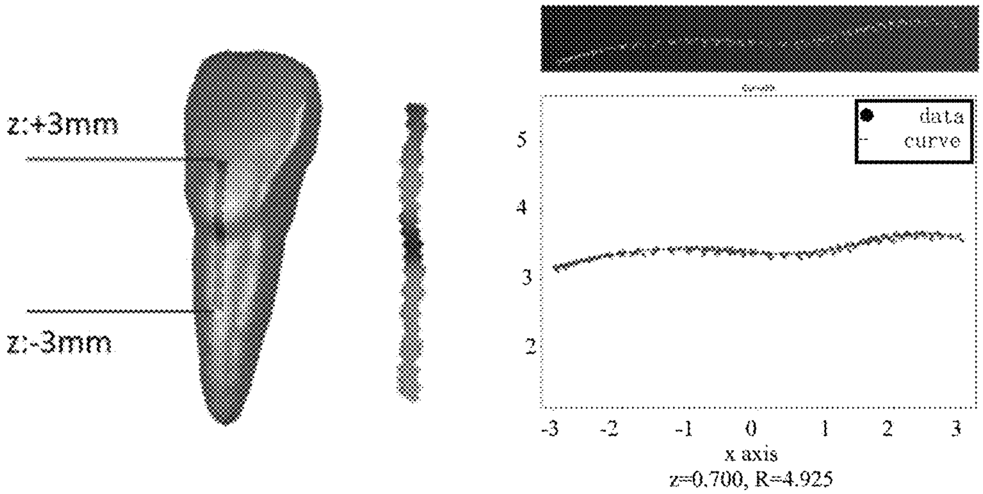
FIG. 9 shows a schematic diagram of a search for the lowest point of the enamel-osseous boundary.

At S44, the method determines a center of an upper largest internally-connected circle of the personalized root-shaped implant STL model according to the personalized root-shaped implant STL model, edits an upper connection structure model of the personalized root-shaped implant STL model according to the center of the upper largest internally-connected circle of the personalized root-shaped implant STL model such that the complete two-segment personalized root-shaped implant model (as shown in FIG. 8) is obtained. That is, the upper connection structure model is used for obtaining the personalized root-shaped implant model which includes two segments. A center of a largest internally-connected circle of the upper part of the personalized root-shaped implant STL model is determined according to the personalized root-shaped implant STL model, and the upper connection structure model of the personalized root-shaped implant STL model is obtained according to the center of the upper largest internally-connected circle of the personalized root-shaped implant STL model such that the personalized root-shaped implant model is generated. Thus, a two-segment personalized root-shaped implant can be manufactured according to the two-segment personalized root-shaped implant model.

Figure 13:
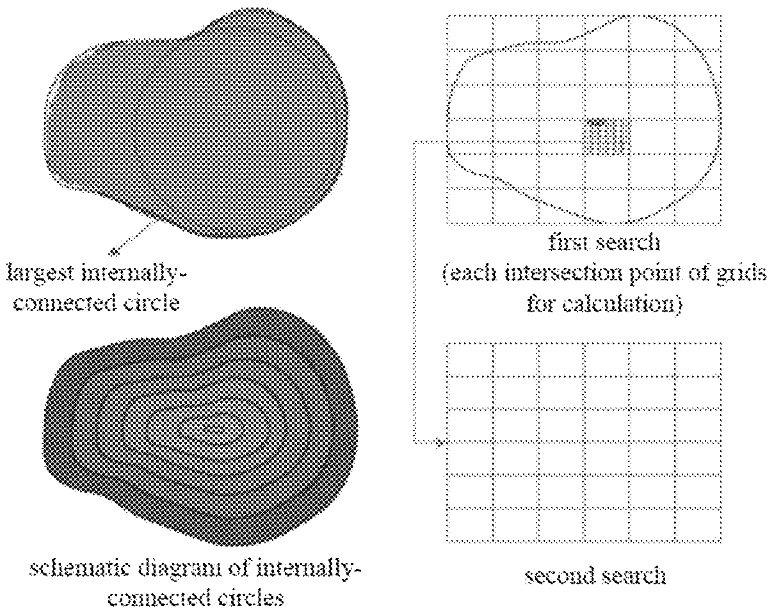
FIG. 13 is a schematic diagram of determining the center of the largest internally-connected circle of an upper part of the personalized root-shaped implant model.

The actions/operations at S44 includes the following (as shown in FIG. 13).

At S441, the method divides an upper contour of the personalized root-shaped implant STL model into a number of grids, performs a traversal search process and calculates a distance of each intersection point of the grids from an edge of the upper contour, and obtains a region in which the center of the upper largest internally connected circle is located. That is, a first distance of each intersection point of the grids is obtained by the first search process, and the region in which the center of the upper largest internally connected circle is located is obtained based on the first distances.

At S442, the method divides the region into another grids with higher precision, performs a second search process and obtains a distance of each intersection point of the grids from the edge of the upper contour of the personalized root-shaped implant STL model, and obtains a location of the center of the upper largest internally connected circle in the personalized root-shaped implant STL model. That is, a second distance of each intersection point of the grids is obtained by the second search process, and the location of the center of the upper largest internally connected circle is obtained based on the second distances.

The two grid traversal search algorithms are used to determine the location of the center of the upper largest internally connected circle. That is, the first search process is performed on grids in the upper contour of the personalized root-shaped implant STL model, and the second search process is performed on the region in which the center of the upper largest internally connected circle is located. The grids for the first search process are different from the grids for the second search process, the grids for the second search process have higher precision than the grids for the first search process. The center of the largest internally connected circle in the upper plane is determined, and an internal connection structure is designed at the center. Thus, connection strength of the connection part can be ensured.

The determining the cutting plane at S42 includes the following.

Firstly, a triangular slice, including an area from a symmetry line of the tooth to 3 mm above the symmetry line of the tooth and an area from the symmetry line of the tooth to 3 mm below the symmetry line of the tooth, is determined, an apex of the triangular slice is extracted, high-order polynomial fitting is performed based on an z and x coordinates of the apex, in which the z coordinate being an independent variable and the x coordinate being a dependent variable, such that a curve is obtained of which a formula is an equation (1), and a z coordinate of a point with a largest positive curvature on the curve is used as a lowest point coordinate of an enamel-osseous boundary, a curvature radius being calculated in an equation (2).

$$x_{fit} = f(z) = a_1 z + a_2 z^2 + \dots + a_{15} z^{15} + a_{16} \tag{1}$$

$$\begin{cases} \rho = \dfrac{1}{K} = \dfrac{(1 + x_{fit}'^2)^{\frac{2}{3}}}{|x_{fit}''|} \\ x_{fit} = f(z) \end{cases} \tag{2}$$

$x_{fit}$ denotes the x coordinate value calculated from the fitted curve, where a1 . . . a16 coefficients are parameters obtained from the high-order polynomial fitting. ρ represents a curvature radius, K represents a curvature. $x_{fit}'$ is the first order derivative with respect to z, and $x_{fit}''$ is the second order derivative with respect to z.

Then, a plane where the lowest point of the enamel-osseous boundary is located is translated, in which an equation for the translation is:

$$\Delta H = -h1 + h2 + h3 \tag{3}$$

The z axis upward is treated as the positive direction, where h1 is a z coordinate of the lowest point of the enamel-osseous boundary, h2 is a distance between the lowest point of the enamel-osseous boundary and an alveolar bone crest, and h3 is a target sub-bone depth. A plane obtained after the translation is the cutting plane.

With the above, an extent of a root of the implant is better determined, the target sub-bone depth of the implant is realized, which is embedded, and effectiveness and aesthetics of the implant are enhanced.

Figure 12:
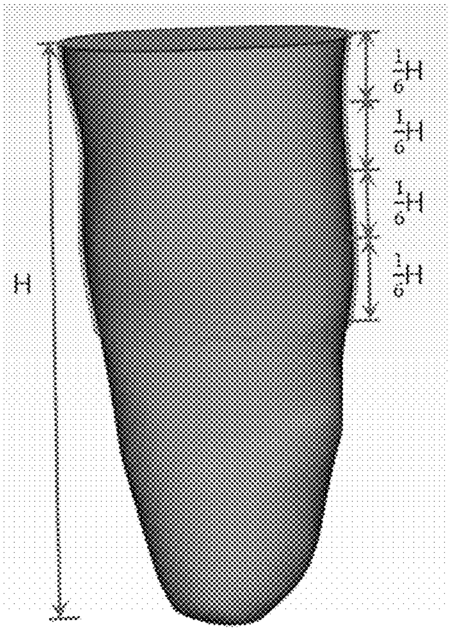
FIG. 12 is a schematic diagram of an area of the personalized root-shaped implant model for the diameter increasing and decreasing.

As shown in FIG. 12, an area and a range of a diameter increasing processing in the diameter increasing and decreasing process at S43 is as follows.

A global gradient-based diameter increasing processing is performed an area from an upper surface of the cut-off portion of the personalized root-shaped implant model down to two-thirds of a length of the cut-off portion of the personalized root-shaped implant model. Specifically, a diameter increase of 0-0.8 mm is used along a surface normal direction from the upper surface of the cut-off portion of the personalized root-shaped implant model to one-sixth of the cut-off portion of the personalized root-shaped implant model, a diameter increase of 0.1-0.9 mm is used along the surface normal direction from the one-sixth of the cut-off portion of the personalized root-shaped implant model to one-third of the cut-off portion of the personalized root-shaped implant model, a diameter increase of 0.2-1 mm is used along the surface normal direction from the one-third of the cut-off portion of the personalized root-shaped implant model to one-half of the cut-off portion of the personalized root-shaped implant model, and a diameter increase of 0-1 mm is used along the surface normal direction from one-half of the cut-off portion of the personalized root implant model to two-thirds of the cut-off portion of the personalized root implant model.

An area and a range of a diameter decreasing processing in the diameter increasing and decreasing process at S43 is as follows.

A labial gradient-based diameter decreasing processing is performed on an area from an upper surface of the personalized root-shaped implant model down to one-half of a length of the personalized root-shaped implant model. Specifically, a diameter decrease of 0-1 mm is used along a labial surface normal direction from the upper surface of the cut-off portion of the personalized root-shaped implant model to one-sixth of the cut-off portion of the personalized root-shaped implant model, a diameter decrease of 0.5-1.5 mm is used along the labial surface normal direction from the one-sixth of the cut-off portion of the personalized root-shaped implant model to one-third of the cut-off portion of the personalized root-shaped implant model, and a diameter decrease of 0-2 mm is used along the labial surface normal direction from the one-third of the cut-off portion of the personalized root-shaped implant model to one-half of the cut-off portion of the personalized root-shaped implant model.

Figure 14:
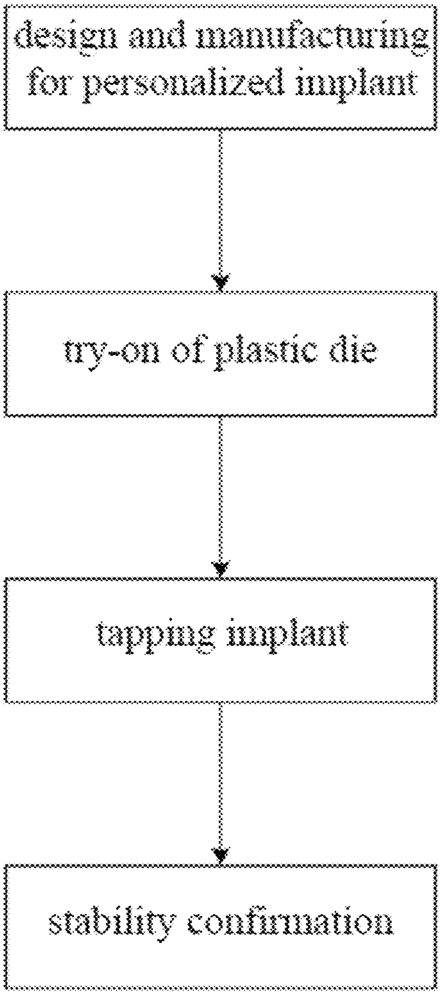
FIG. 14 is a schematic diagram of a use process of the personalized root-shaped implant.

(As shown in FIG. 14) A using method of a two-segment personalized implant includes the following.

The method removes a root of a patient's tooth and clear an alveolar socket.

The method prepares the alveolar socket according to a personalized root-shaped implant and a plastic die designed before a surgery, removes a part of inverted concavities and unnecessary alveolar spacings, and prepares for implantation of the personalized root-shaped implant after the plastic die is properly tried on.

The method places the plastic die into the patient's alveolar socket and checks a size and an orientation thereof.

The method places the personalized root-shaped implant into the alveolar socket in the orientation, and taps the personalized root-shaped implant into a position thereof using an appropriate force with a tapping tool, after more than ⅔ of the implant is in the alveolar socket.

There is a result confirmation process, in which an ISQ (implant Stability Quotient) value of the personalized root-shaped implant is measured with a kinematic instrument. If the ISQ value is less than 50, the initial stability is insufficient, and the personalized root-shaped implant is removed and replaced with another specification for implantation again.

Figure 15:
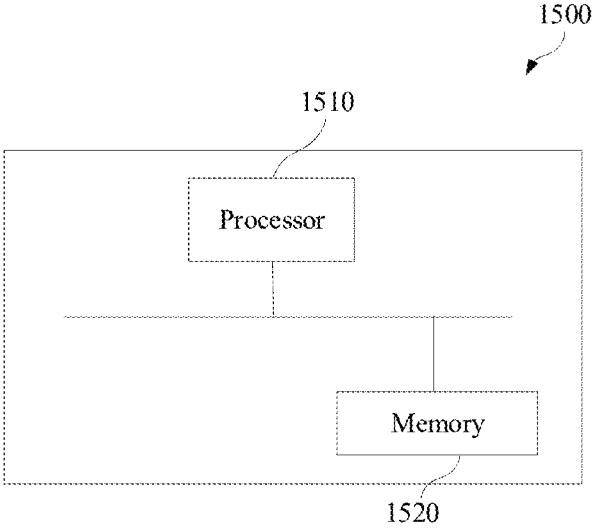
FIG. 15 is a structural schematic view of an electronic device according to some embodiments of the present disclosure.

FIG. 15 is a structural schematic view of an electronic device according to some embodiments of the present disclosure. The electronic device 1500 may include a processor 1510 and a memory 1520, which are coupled together.

The memory 1520 is configured to store executable program instructions. The processor 810 may be configured to read the executable program instructions stored in the memory 1520 to implement a procedure corresponding to the executable program instructions, so as to perform any method as described in the previous embodiments or a method provided arbitrarily and non-conflicting combination of the previous embodiments, for example, a method for generating a personalized root-shaped implant model.

The electronic device 1500 may be a computer, a sever, etc. in one example. The electronic device 1500 may be a separate component integrated in a computer or a sever in another example.

A non-transitory computer-readable storage medium is provided, which may be in the memory 1520. The non-transitory computer-readable storage medium stores instructions, when executed by a processor, causing the processor to perform the method as described in the previous embodiments.

A person of ordinary skill in the art may appreciate that, in combination with the examples described in the embodiments disclosed in this specification, units and algorithm steps may be implemented by electronic hardware, computer software, or a combination thereof. In order to clearly describe the interchangeability between the hardware and the software, the foregoing has generally described compositions and steps of every embodiment according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It can be clearly understood by a person skilled in the art that, for the purpose of convenient and brief description, for a detailed working process of the foregoing system, apparatus and unit, reference may be made to the corresponding process in the method embodiments, and the details will not be described herein again.

In the several embodiments provided in the present disclosure, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units herein may be selected according to the actual needs to achieve the objectives of the solutions of the embodiments of the present disclosure.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

When the integrated unit are implemented in a form of a software functional unit and sold or used as an independent product, the integrated unit may be stored in a computer-readable storage medium. Based on such an understanding, the technical solutions of the present disclosure essentially, or the part contributing to the prior art, or all or a part of the technical solutions may be implemented in a form of software product. The computer software product is stored in a storage medium, for example, non-transitory computer-readable storage medium, and includes several instructions for instructing a computer device (which may be a personal computer, a server, or a network device) to perform all or a part of the steps of the methods described in the embodiments of the present disclosure. The foregoing storage medium includes any medium that can store program codes, such as a USB flash disk, a removable hard disk, a read-only memory (ROM), a random access memory (RAM), a magnetic disk, or an optical disk.

The foregoing descriptions are merely specific embodiments of the present disclosure, but are not intended to limit the protection scope of the present disclosure. Any equivalent modification or replacement figured out by a person skilled in the art within the technical scope of the present disclosure shall fall within the protection scope of the present disclosure. Therefore, the protection scope of the present disclosure shall be subject to the protection scope of the claims.

What describes above is only embodiments of the present disclosure, in which a known specific structure and characteristics thereof are not described herein. It should be noted that, for these skilled in the field, a number of deformations and improvements can be made without departing from the structure of the present disclosure, which should also be regarded as being in the claimed scope of the present disclosure and will not affect the implementation effect of the present disclosure and the patent practicality. The claimed scope of the present disclosure shall be subject to the contents of its claims, and detailed embodiments of the description can be used to explain the contents of the claims.

What is claimed is:

1. A method for generating a personalized root-shaped implant model, comprising:

capturing a CBCT image of a missing teeth area of a patient;

performing image segmentation and model reconstruction on the CBCT image and obtains a full-mouth original teeth model;

selecting a target tooth model from the full-mouth original teeth model; and processing the target tooth model in a preset strategy such that the personalized root-shaped implant model is generated;

wherein the processing the target tooth model in a preset strategy comprises:

determining a direction of the target tooth model and a coordinate of the target tooth model;

determining a cutting plane of the target tooth model according to a height of the target tooth model;

cutting the target tooth model at the cutting plane by using a manner of topological cutting, such that a cut-off portion of the target tooth model is obtained;

performing a diameter increasing and decreasing process on the cut-off portion and obtaining a personalized root-shaped implant STL model;

determining a center of an upper largest internally-connected circle of the personalized root-shaped implant STL model according to the personalized root-shaped implant STL model; and obtaining an upper connection structure model of the personalized root-shaped implant STL model according to the center of the upper largest internally-connected circle of the personalized root-shaped implant STL model such that the personalized root-shaped implant model is generated.

2. The method as claimed in claim 1, wherein the determining a center of an upper largest internally-connected circle of the personalized root-shaped implant STL model according to the personalized root-shaped implant STL model comprises:

dividing an upper contour of the personalized root-shaped implant STL model into a plurality of grids, obtaining a respective first distance of each intersection point of the grids from an edge of the upper contour by performing a first search process, and obtaining a region in which the center of the largest internally connected circle is located based on the respective first distance; and dividing the region into another grids, obtaining a respective second distance of each intersection point of the another grids from the edge of the upper contour of the personalized root-shaped implant STL model by performing a second search process, and obtaining a location of the center of the upper largest internally connected circle in the personalized root-shaped implant STL model based on the respective second distance.

3. The method as claimed in claim 1, wherein the determining a cutting plane of the target tooth model comprises:

determining a triangular slice, extracting an apex of the triangular slice, performing high-order polynomial fitting based on an z and x coordinates of the apex such that a curve is obtained in an equation (1), and using a z coordinate of a point with a largest positive curvature on the curve as a lowest point coordinate of an enamel-osseous boundary, a curvature radius being calculated in an equation (2);

$$x_{fit} = f(z) = a_1 z + a_2 z^2 + \ldots + a_{15} z^{15} + a_{16} \quad (1)$$

$$\begin{cases} \rho = \dfrac{1}{K} = \dfrac{\left(1 + x_{fit}'^2\right)^{\frac{2}{3}}}{|x_{fit}'|} \\ x_{fit} = f(z) \end{cases} \quad (2)$$

wherein $x_{fit}$ denotes the x coordinate value calculated from the fitted curve, where a1 . . . a16 coefficients are parameters obtained from the high-order polynomial fitting. ρ represents a curvature radius, K represents a curvature. $x_{fit}'$ is the first order derivative with respect to z, and $X_{fit}''$ is the second order derivative with respect to z; and translating a plane where the lowest point of the enamel-osseous boundary is located, such that a translated plane is the cutting plane, wherein an equation for the translation is:

$$\Delta H = -h1 + h2 + h3 \quad (3)$$

wherein the z axis upward is treated as the positive direction, h1 is a z coordinate of the lowest point of the enamel-osseous boundary, h2 is a distance between the lowest point of the enamel-osseous boundary and an alveolar bone crest, and h3 is a target sub-bone depth.

4. The method as claimed in claim 3, wherein the triangular slice comprises an area from a symmetry line of the target tooth model to 3 mm above the symmetry line of the target tooth model and an area from the symmetry line of the target tooth model to 3 mm below the symmetry line of the target tooth model.

5. The method as claimed in claim 1, wherein the cut-off portion comprises an area from an upper surface of the cut-off portion down to two-thirds of a length of the cut-off portion;

the performing a diameter increasing and decreasing process on the cut-off portion comprises:

performing a global gradient-based diameter increasing processing on the area from an upper surface of the cut-off portion down to two-thirds of a length of the cut-off portion.

6. The method as claimed in claim 5, wherein a diameter increase of 0-0.8 mm is used along a surface normal direction from the upper surface of the cut-off portion to one-sixth of the cut-off portion, a diameter increase of 0.1-0.9 mm is used along the surface normal direction from the one-sixth of the cut-off portion to one-third of the cut-off portion, a diameter increase of 0.2-1 mm is used along the surface normal direction from the one-third of the cut-off portion to one-half of the cut-off portion, and a diameter increase of 0-1 mm is used along the surface normal direction from one-half of the cut-off portion to two-thirds of the cut-off portion.

7. The method as claimed in claim 1, wherein the cut-off portion comprises an area from an upper surface of the cut-off portion down to one-half of a length of the cut-off portion;

the performing a diameter increasing and decreasing process on the cut-off portion comprises:

performing a labial gradient-based diameter decreasing processing on the area from an upper surface of the cut-off portion down to one-half of a length of the cut-off portion.

8. The method as claimed in claim 7, wherein a diameter decrease of 0-1 mm is used along a labial surface normal direction from the upper surface of the cut-off portion to one-sixth of the cut-off portion, a diameter decrease of 0.5-1.5 mm is used along the labial surface normal direction from the one-sixth of the cut-off portion to one-third of the cut-off portion, and a diameter decrease of 0-2 mm is used along the labial surface normal direction from the one-third of the cut-off portion to one-half of the cut-off portion.

9. A method for manufacturing a personalized root-shaped implant, comprising:

obtaining a personalized root-shaped implant model; and manufacturing a personalized root-shaped implant and a die of the personalized root-shaped implant according to the personalized root-shaped implant model;

wherein obtaining the personalized root-shaped implant model comprises:

capturing a CBCT image of a missing teeth area of a patient;

performing image segmentation and model reconstruction on the CBCT image and obtains a full-mouth original teeth model;

selecting a target tooth model from the full-mouth original teeth model; and processing the target tooth model in a preset strategy such that the personalized root-shaped implant model is generated;

wherein the processing the target tooth model in a preset strategy comprises:

determining a direction of the target tooth model and a coordinate of the target tooth model;

determining a cutting plane of the target tooth model according to a height of the target tooth model;

cutting the target tooth model at the cutting plane by using a manner of topological cutting, such that a cut-off portion of the target tooth model is obtained;

performing a diameter increasing and decreasing process on the cut-off portion and obtaining a personalized root-shaped implant STL model;

determining a center of an upper largest internally-connected circle of the personalized root-shaped implant STL model according to the personalized root-shaped implant STL model; and obtaining an upper connection structure model of the personalized root-shaped implant STL model according to the center of the upper largest internally-connected circle of the personalized root-shaped implant STL model such that the personalized root-shaped implant model is generated.

10. The method as claimed in claim 9, wherein personalized root-shaped implant is a metal root-shaped implant, and the die is a plastic die.

11. The method as claimed in claim 9, wherein the determining a center of an upper largest internally-connected circle of the personalized root-shaped implant STL model according to the personalized root-shaped implant STL model comprises:

dividing an upper contour of the personalized root-shaped implant STL model into a plurality of grids, obtaining a respective first distance of each intersection point of the grids from an edge of the upper contour by performing a first search process, and obtaining a region in which the center of the largest internally connected circle is located based on the respective first distance; and dividing the region into another grids, obtaining a respective second distance of each intersection point of the another grids from the edge of the upper contour of the personalized root-shaped implant STL model by performing a second search process, and obtaining a location of the center of the upper largest internally connected circle in the personalized root-shaped implant STL model based on the respective second distance.

12. The method as claimed in claim 9, wherein the determining a cutting plane of the target tooth model comprises:

determining a triangular slice, extracting an apex of the triangular slice, performing high-order polynomial fitting based on an z and x coordinates of the apex such that a curve is obtained in an equation (1), and using a z coordinate of a point with a largest positive curvature on the curve as a lowest point coordinate of an enamel-osseous boundary, a curvature radius being calculated in an equation (2);

$$x_{fit} = f(z) = a_1 z + a_2 z^2 + \ldots + a_{15} z^{15} + a_{16} \tag{1}$$

$$\begin{cases} \rho = \frac{1}{K} = \frac{\left(1 + x_{fit}'^2\right)^{\frac{2}{3}}}{|x_{fit}'|} \\ x_{fit} = f(z) \end{cases} \tag{2}$$

wherein $x_{fit}$ denotes the x coordinate value calculated from the fitted curve, where a1 . . . a16 coefficients are parameters obtained from the high-order polynomial fitting. ρ represents a curvature radius, K represents a curvature. $x_{fit}'$ is the first order derivative with respect to z, and $x_{fit}''$ is the second order derivative with respect to z; and translating a plane where the lowest point of the enamel-osseous boundary is located, such that a translated plane is the cutting plane, wherein an equation for the translation is:

$$\Delta H = -h1 + h2 + h3 \tag{3}$$

wherein the z axis upward is treated as the positive direction, h1 is a z coordinate of the lowest point of the enamel-osseous boundary, h2 is a distance between the lowest point of the enamel-osseous boundary and an alveolar bone crest, and h3 is a target sub-bone depth.

13. The method as claimed in claim 12, wherein the triangular slice comprises an area from a symmetry line of the target tooth model to 3 mm above the symmetry line of the target tooth model and an area from the symmetry line of the target tooth model to 3 mm below the symmetry line of the target tooth model.

14. The method as claimed in claim 9, wherein the cut-off portion comprises an area from an upper surface of the cut-off portion down to two-thirds of a length of the cut-off portion;

the performing a diameter increasing and decreasing process on the cut-off portion comprises:

performing a global gradient-based diameter increasing processing on the area from an upper surface of the cut-off portion down to two-thirds of a length of the cut-off portion.

15. The method as claimed in claim 14, wherein a diameter increase of 0-0.8 mm is used along a surface normal direction from the upper surface of the cut-off portion to one-sixth of the cut-off portion, a diameter increase of 0.1-0.9 mm is used along the surface normal direction from the one-sixth of the cut-off portion to one-third of the cut-off portion, a diameter increase of 0.2-1 mm is used along the surface normal direction from the one-third of the cut-off portion to one-half of the cut-off portion, and a diameter increase of 0-1 mm is used along the surface normal direction from one-half of the cut-off portion to two-thirds of the cut-off portion.

16. The method as claimed in claim 9, wherein the cut-off portion comprises an area from an upper surface of the cut-off portion down to one-half of a length of the cut-off portion;

the performing a diameter increasing and decreasing process on the cut-off portion comprises:

performing a labial gradient-based diameter decreasing processing on the area from an upper surface of the cut-off portion down to one-half of a length of the cut-off portion.

17. The method as claimed in claim 16, wherein a diameter decrease of 0-1 mm is used along a labial surface normal direction from the upper surface of the cut-off portion to one-sixth of the cut-off portion, a diameter decrease of 0.5-1.5 mm is used along the labial surface normal direction from the one-sixth of the cut-off portion to one-third of the cut-off portion, and a diameter decrease of 0-2 mm is used along the labial surface normal direction from the one-third of the cut-off portion to one-half of the cut-off portion.

18. A method for using a personalized root-shaped implant, comprising:

obtaining the personalized root-shaped implant model and a die of the personalized root-shaped implant; and tapping the personalized root-shaped implant into the alveolar socket after the die is properly tried on;

wherein the obtaining the personalized root-shaped implant and the die of the personalized root-shaped implant comprises:

capturing a CBCT image of a missing teeth area of a patient;

performing image segmentation and model reconstruction on the CBCT image and obtains a full-mouth original teeth model;

selecting a target tooth model from the full-mouth original teeth model;

processing the target tooth model in a preset strategy such that the personalized root-shaped implant model is generated; and manufacturing the personalized root-shaped implant and the die of the personalized root-shaped implant according to the personalized root-shaped implant model;

wherein the processing the target tooth model in a preset strategy comprises:

determining a direction of the target tooth model and a coordinate of the target tooth model;

determining a cutting plane of the target tooth model according to a height of the target tooth model;

cutting the target tooth model at the cutting plane by using a manner of topological cutting, such that a cut-off portion of the target tooth model is obtained;

performing a diameter increasing and decreasing process on the cut-off portion and obtaining a personalized root-shaped implant STL model;

determining a center of an upper largest internally-connected circle of the personalized root-shaped implant STL model according to the personalized root-shaped implant STL model; and obtaining an upper connection structure model of the personalized root-shaped implant STL model according to the center of the upper largest internally-connected circle of the personalized root-shaped implant STL model such that the personalized root-shaped implant model is generated.

* * * * *